(12) United States Patent
Ho (10) Patent No.: US 7,534,116 B2
(45) Date of Patent: May 19, 2009

(54) EJECT MECHANISM FOR MEMORY CARD CONNECTOR

(75) Inventor: Yi-Tse Ho, Tainan Hsien (TW)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 11/596,495

(22) PCT Filed: May 11, 2005

(86) PCT No.: PCT/US2005/016532

§ 371 (c)(1),
(2), (4) Date: Oct. 2, 2007

(87) PCT Pub. No.: WO2005/114558

PCT Pub. Date: Dec. 1, 2005

(65) Prior Publication Data

US 2008/0057754 A1    Mar. 6, 2008

(30) Foreign Application Priority Data

May 12, 2004    (CN) .................. 2004 1 0037857

(51) Int. Cl.
*H01R 13/62* (2006.01)
(52) U.S. Cl. .................................. 439/159
(58) Field of Classification Search ................ 439/159, 439/160, 630, 64, 92
See application file for complete search history.

(56) References Cited

U.S. PATENT DOCUMENTS

| | | | | |
|---|---|---|---|---|
| 5,286,214 | A * | 2/1994 | Takahashi | 439/159 |
| 6,162,075 | A * | 12/2000 | Hara et al. | 439/159 |
| 6,648,694 | B2 * | 11/2003 | Takamori et al. | 439/630 |
| 6,652,301 | B2 * | 11/2003 | Harasawa et al. | 439/159 |
| 6,843,670 | B2 * | 1/2005 | Yamaguchi et al. | 439/159 |
| 6,910,901 | B2 * | 6/2005 | Akasaka et al. | 439/159 |
| 6,988,904 | B1 * | 1/2006 | Lai | 439/159 |
| 7,004,774 | B2 * | 2/2006 | Chia-Chen | 439/188 |
| 7,037,123 | B2 * | 5/2006 | Nakamura et al. | 439/152 |
| 7,090,513 | B2 * | 8/2006 | Kuo | 439/92 |
| 7,101,227 | B2 * | 9/2006 | Kuo | 439/630 |
| 7,147,495 | B2 * | 12/2006 | Kuo | 439/159 |
| 7,275,964 | B2 * | 10/2007 | Ting et al. | 439/630 |
| 2003/0054694 | A1 * | 3/2003 | Takamori et al. | 439/630 |
| 2003/0224640 | A1 | 12/2003 | Sato et al. | |
| 2004/0014342 | A1 * | 1/2004 | Yu et al. | 439/159 |

(Continued)

FOREIGN PATENT DOCUMENTS

EP    1 132 860 A2    9/2001

(Continued)

*Primary Examiner*—Hae Moon Hyeon
*Assistant Examiner*—Vladimir Imas (57) ABSTRACT

A memory card connector includes a metal shell defining a receiving space for receiving a memory card inserted into the receiving space in an insertion direction through an insert opening generally at a front end of the shell. An insulating socket is disposed generally at a rear end of the metal shell and includes a plurality of conductive terminals. A push/push card ejector is provided and includes a slider. The push/push card ejector also includes an actuating lever that extends transversely of the insertion direction and has a first end pivotally attached to the slider and a second end engageable with the memory card for engaging and ejecting the memory card. The connector may be configured so as to minimize packaging space outside of the metal shell.

19 Claims, 8 Drawing Sheets

U.S. PATENT DOCUMENTS

| | | | |
|---|---|---|---|
| 2004/0018761 A1* | 1/2004 | Akasaka et al. | 439/159 |
| 2004/0067668 A1* | 4/2004 | Hirata et al. | 439/159 |
| 2004/0067669 A1* | 4/2004 | Akasaka et al. | 439/159 |
| 2004/0259399 A1* | 12/2004 | Chang | 439/159 |
| 2004/0259400 A1* | 12/2004 | Chang | 439/159 |
| 2004/0266237 A1* | 12/2004 | Kodera et al. | 439/159 |
| 2005/0003691 A1* | 1/2005 | Toda | 439/159 |
| 2005/0272283 A1* | 12/2005 | Chang | 439/92 |
| 2005/0272291 A1* | 12/2005 | Chang | 439/159 |
| 2007/0190817 A1* | 8/2007 | Masubuchi et al. | 439/64 |
| 2007/0218727 A1* | 9/2007 | Ting et al. | 439/159 |

FOREIGN PATENT DOCUMENTS

| | | |
|---|---|---|
| WO | WO 03/003289 A1 | 1/2003 |

* cited by examiner

EJECT MECHANISM FOR MEMORY CARD CONNECTOR

This application claims priority to PCT application No. PCT/US05/016532, filed May 11, 2005, which in turn claims priority to Chinese Application 200410037857.7, filed May 12, 2004.

FIELD OF THE INVENTION

This invention generally relates to the art of electrical connectors and, particularly, to a memory card connector having a unique card eject mechanism.

BACKGROUND OF THE INVENTION

Memory cards are known in the art and contain intelligence in the form of a memory circuit or other electronic program. Some form of card reader reads the information or memory stored on the card. Such cards are used in many applications in today's electronic society, including video cameras, digital still cameras, smart phones, PDA's, music players, ATMs, cable television decoders, toys, games, PC adapters, multi-media cards and other electronic applications. Typically, a memory card includes a contact or terminal array for connection through a card connector to a card reader system and then to external equipment. The connector readily accommodates insertion and removal of the card to provide quick access to the information and program on the card. The card connector includes terminals for yieldingly engaging the contact array of the memory card.

The memory card connector often is mounted on a printed circuit board. The memory card, itself, writes or reads via the connector and can transmit between electrical appliances, such as a word processor, personal computer, personal data assistant or the like. With circuit board mounted connectors, the terminals of a connector include tail portions which are connected to appropriate circuit traces on the printed circuit board by various systems, such as surface mount technology where the tail portions are reflow soldered to the circuit traces. Through hole technology involves inserting the tail portions of the terminals into the holes in the printed circuit board for connection, as by soldering, to circuit traces on the board and/or in the holes.

Figure 13:
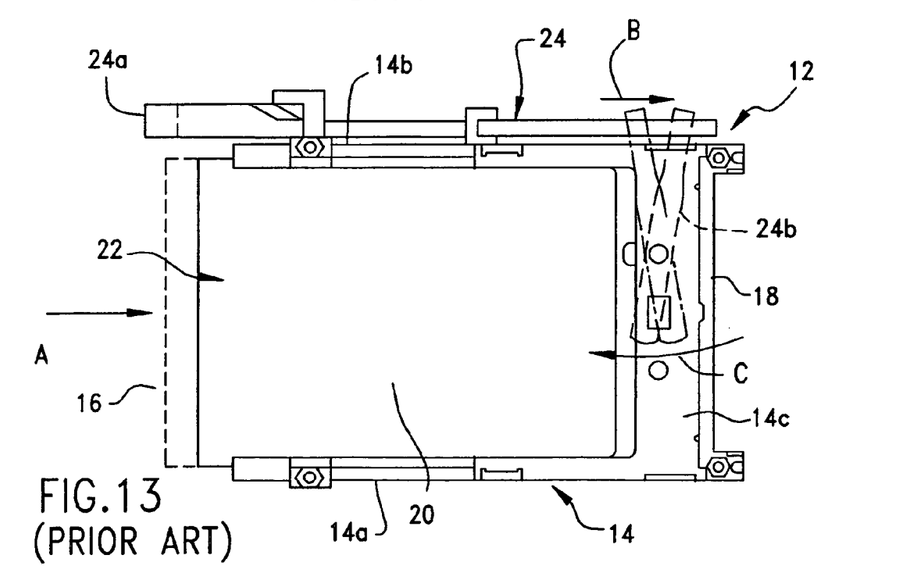
FIG. 13 is a top plan view of the prior art connector described in the Background, above.

FIG. 13 shows somewhat schematically a board mounted memory card connector, generally designated 12, for mounting on a printed circuit board according to the prior art and adapted for receiving existing memory cards. The connector includes a frame or housing, generally designated 14, having a front card-receiving end 16 and a rear end 18. The housing is molded of dielectric material such as plastic or the like and includes a pair of side walls 14a and 14b projecting forwardly from opposite ends of a rear terminal-mounting section 14c. A card-receiving space, generally designated 20, is formed between side walls 14a and 14b for receiving a memory card, generally designated 22, inserted into the connector in the direction of arrow "A". A card eject mechanism, generally designated 24, is mounted on side wall 14b and includes a push rod 24a pivotally connected to an ejection rod 24b which is pivoted to the rear terminal-mounting section 14c of the housing at pivot point 26. After memory card 22 is inserted into the card-receiving space 20, the card can be ejected by pushing on rod 24a in the direction of arrow "B" which, in turn, pivots a distal end of ejecting rod 24b in the direction of arrow "C" to at least partially eject the memory card from its fully connected position. Insertion of a memory card back into the connector restores the eject mechanism to its ejection condition as shown in full lines in FIG. 13. The entire structure of connector 12 most often will be covered with a metal housing or shell to provide EMI protection for the memory card connections.

Memory card connectors of the prior art theoretically can be used with the relatively new standard ExpressCard type memory cards. However, current portable electronic products tend to be light, thin, short and small, and memory card connectors are becoming quite miniaturized such as in a notebook PC. The front end of the memory card connector preferably should approach the width of the memory card, itself, so that the connector occupies the smallest area without affecting surrounding electronic connectors. Card eject mechanisms typically create problems when attempting to miniaturize memory card connectors. The present invention is directed to solving these problems and satisfying a need for a memory card connector having a card eject mechanism which facilitates size reductions in the connector.

SUMMARY OF THE INVENTION

An object, therefore, of the invention is to provide a memory card connector with a new and improved card eject mechanism.

In the exemplary embodiment of the invention, the connector includes a metal shell defining a receiving space for receiving a memory card inserted into the receiving space in an insertion direction through an insert opening generally at a front end of the shell. An insulating socket is disposed generally at a rear end of the metal shell opposite the insert opening and includes a plurality of terminal-receiving passages in which a plurality of conductive terminals are disposed. A card eject mechanism is provided of the push/push type and includes a body, with a slider movably mounted on the body for reciprocating sliding movement in the insertion direction. A cam slot and cam follower means are operatively associated with the slider for controlling movement of the slider in a push/push action. An actuating lever extends transversely of the insertion direction and has a first end pivotally attached to the slider and a second end engageable with the memory card for engaging and ejecting the memory card. The lever is pivotally mounted intermediate its first and second ends.

According to one aspect of the invention, pivot means are provided for pivotally mounting the actuating lever to the metal shell. The shell includes a top wall defining a top of the receiving space. The pivot means is formed between the lever and the top wall of the metal shell. The actuating lever is located above the insulating socket immediately beneath the top wall of the metal shell. In the preferred embodiment, the metal shell is stamped and formed of sheet metal material.

According to another aspect of the invention, the actuating lever is a plate-like member located at the top of the receiving space above the inserted memory card, immediately beneath the top wall of the metal shell. Therefore, the lever occupies negligible space within the connector. The lever includes a downwardly projecting ejection tab at the second end of the lever and engageable with the memory card.

According to a further aspect of the invention, the front end of the metal shell is wider than the rear end thereof, whereby the receiving space is generally L-shaped in a plane generally parallel to the top wall of the metal shell. The body and the slider of the card eject mechanism are located behind the wider front end of the metal shell alongside the narrower rear end of the metal shell. The actuating lever extends across the narrower rear end of the shell. The actuating lever extends across the narrower end of the L-shaped receiving space.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
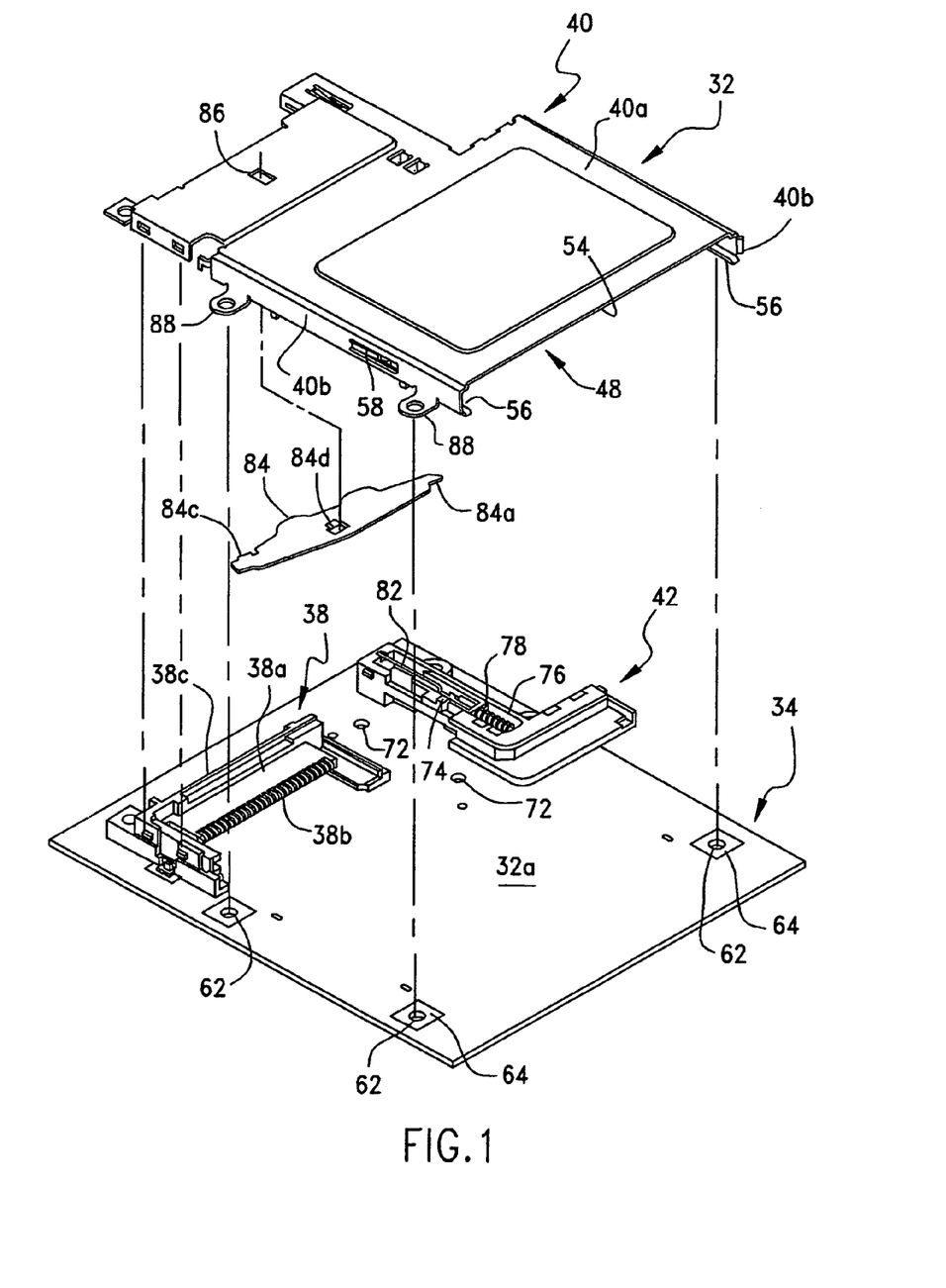
FIG. 1 is an exploded perspective view of a memory card connector according to a first embodiment of the invention.
Figure 2:
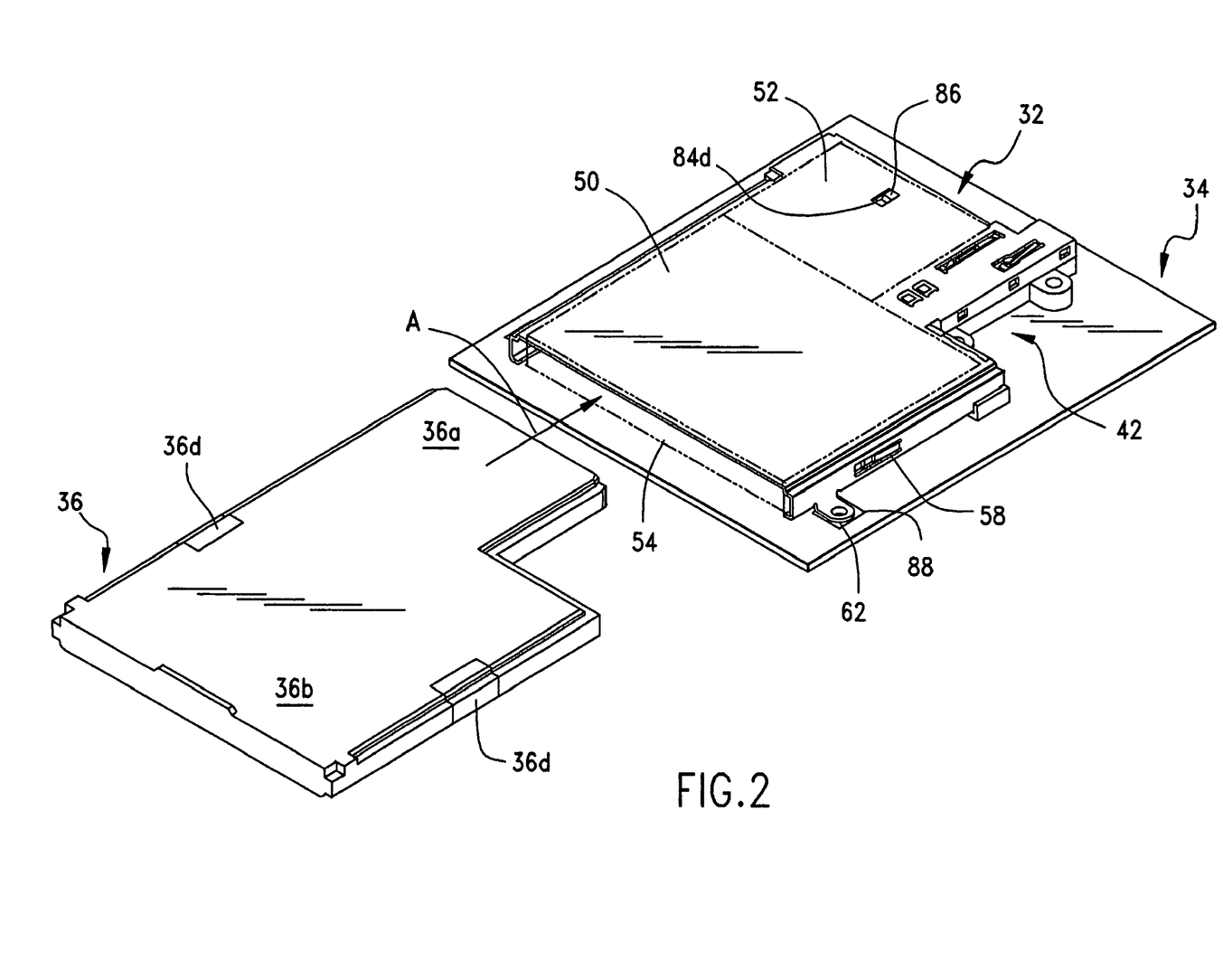
FIG. 2 is a perspective view of the memory card connector mounted on a printed circuit board and about to receive an ExpressCard type memory card.

Referring to the drawings in greater detail, and first to FIGS. 1 and 2, a first embodiment of the invention is incorporated in a memory card connector, generally designated 32, for mounting on a printed circuit board, generally designated 34. The connector receives a memory card, generally designated 36, inserted into the connector in the direction of arrow "A" in FIG. 2. The connector includes an interior, insulating terminal socket, generally designated 38; an outer, shielding metal shell, generally designated 40; and an interior card eject mechanism, generally designated 42. A plurality of conductive terminals, generally designated 44 (FIG. 3) are mounted in the terminal socket.

Figure 3:
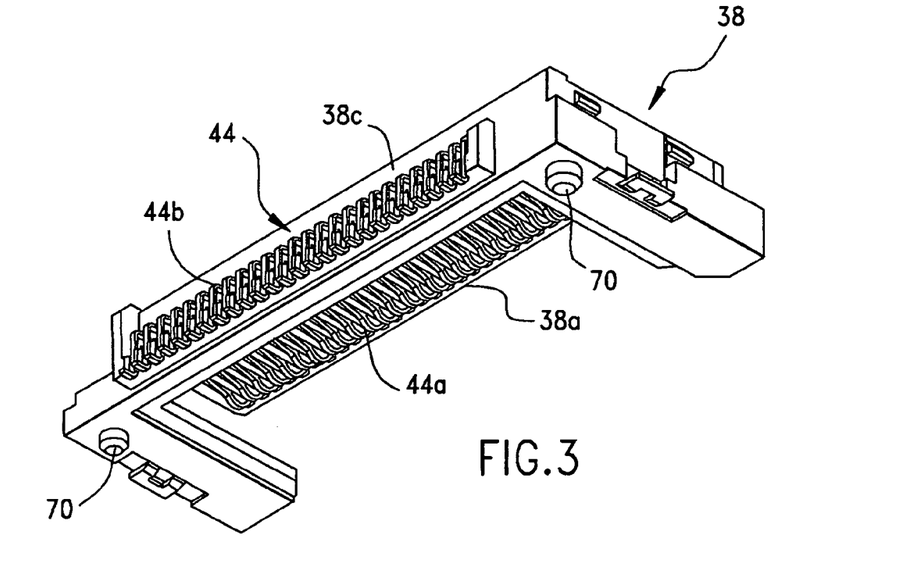
FIG. 3 is a bottom perspective view of the terminal socket of the connector.

Referring to FIG. 3 in conjunction with FIG. 1, terminal socket 38 is a one-piece structure unitarily molded of dielectric material such as plastic or the like. The socket includes a body 38a having a plurality of terminal-receiving passages 38b for receiving terminals 44. Body 38a has a front mating end 38c. As best seen in FIG. 3, when terminals 44 are mounted in terminal socket 38, the terminals have front contact ends 44a for engaging appropriate contacts on the memory card. The terminals have rear tail portions 44b for connection, as by soldering, to a plurality of circuit traces on a top surface 34a of printed circuit board 34.

Metal shell 40 is stamped and formed of conductive sheet metal material and includes a top wall 40a and a pair of side walls 40b which define a card-receiving space, generally designated 48, therebetween. The metal shell has a wider front end portion 50 (FIG. 2) and a narrower rear end portion 52, whereby card-receiving space 48 is generally L-shaped in a horizontal plane or generally parallel to the top wall of the shell. A front insert opening 54 is formed at the front of the metal shell between side walls 40b thereof. Guide grooves 56 are formed in the insides of side walls 40b of the metal shell. A flexible grounding finger 58 is stamped and formed out of each side wall 40b and projects inwardly therefrom, for purposes to be described below. Finally, a spring finger 60 is stamped and formed out of top wall 40a of the metal shell, again for purposes described below.

Before proceeding, and referring specifically to FIG. 2, memory card connector 36 is according to the ExpressCard specification. Consequently, the memory card includes a narrower leading end portion 36a and a wider trailing end portion 36b which matches the L-shaped horizontal configuration of metal shell 40 as the memory card is inserted into the connector in the direction of arrow "A". Leading end portion 36a of the memory card has a socket (not visible in the drawing) within which a plurality of appropriate contacts are exposed for engaging contact portions 44a of terminals 44. A pair of ground contacts 36d are disposed at opposite sides of memory card 36 for engaging the flexible grounding fingers 58 of metal housing 40.

Printed circuit board 34 has a pair of ground pads 62 on top surface 34a of the board. A through hole 64 extends through the circuit board and through each ground pad 62 for receiving an appropriate fastener inserted upwardly through the hole and through the ground pad. The circuit board includes a pair of mounting holes (not visible) for receiving a pair of mounting posts 70 (FIG. 3) for mounting terminal socket 38 to the board, along with a pair of mounting holes 72 for mounting card eject mechanism 42 to the board.

Figure 4:
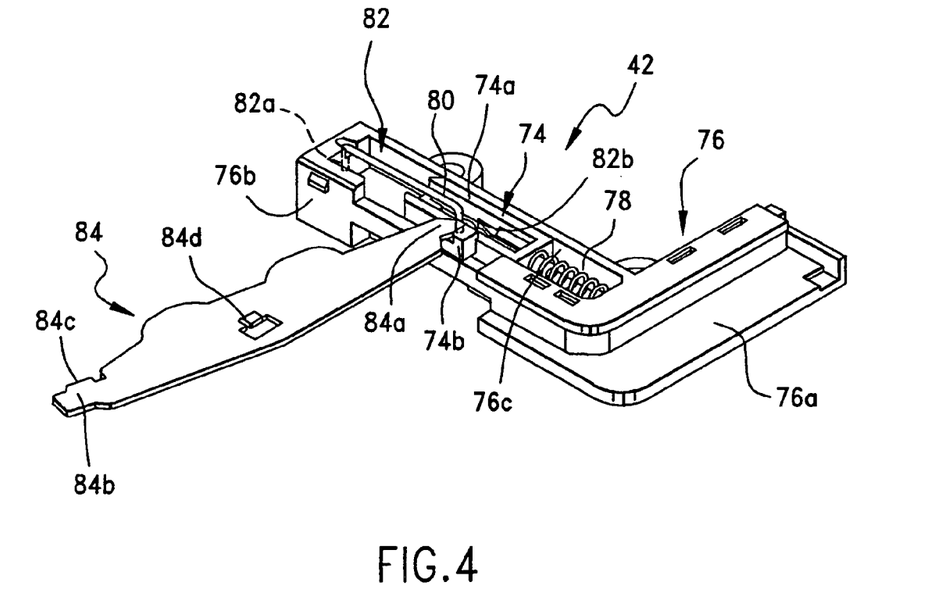
FIG. 4 is a top perspective view of the card eject mechanism of the connector.

Referring to FIG. 4 in conjunction with FIGS. 1 and 2, card eject mechanism 42 is mounted in the narrower rear end portion 52 of metal shell 40, alongside terminal socket 38. The eject mechanism is a push/push type ejector and includes a cam slider, generally designated 74, slidably mounted on a base, generally designated 76, which is fixed to printed circuit board 34 by appropriate fasteners in mounting holes 72 in the board. Base 76 has a vertical portion 76a and a body portion 76b which extends in a front-to-rear direction relative to the connector. A sliding groove 76c is formed in the top of body portion 76b for receiving a sliding body portion 74a of cam slider 74. A coil spring 78 is positioned within the rear end of groove 76c of base 76 and abuts against body portion 74a of cam slider 74 to bias the cam slider forwardly in the eject direction. Cam slider 74 has a transverse portion 74b for purposes described below.

Still referring to FIG. 4 in conjunction with FIG. 1, cam slider 74 has a cam slot 80 in the top of body portion 74a which, as is known in the art, is generally heart-shaped to define the push/push movement of the memory card into and out of card-receiving space 48. Generally, a cam follower, generally designated 82, rides within cam slot 80 to control movement of cam slider 74 in its push/push action. Specifically, cam follower 82 is generally U-shaped and includes a hook portion 82a at a rear end thereof fixed to base 76, and a pivot portion 82b at a front end thereof which projects into and rides within cam slot 80.

Card eject mechanism 42 further includes an actuating lever, generally designated 84, which extends transversely across the card-receiving space 48, generally transversely of the card insertion and ejection direction "A". The actuating lever has a first end 84a pivotally attached to a transverse portion 74b of cam slider 74. A second end 84b of the actuating lever has a downwardly projecting ejection tab 84c for engaging the memory card and ejecting the memory card from the receiving space. Generally, pivot means are provided for pivotally mounting actuating lever 84 to top wall 40a of metal shell 40. Specifically, a pivot tab 84d projects upwardly from actuating lever 84 intermediate the opposite ends of the lever. The pivot tab projects into a pivot opening 86 in the top wall of the metal shell as can be seen in FIG. 2. As can be seen clearly in FIG. 4, actuating lever 84 is a thin plate-like member. The plate-like actuating lever is located at the top of receiving space 48 immediately beneath top wall 40a of the metal shell and above terminal socket 38. Therefore, the very thin actuating lever takes up negligible space within the connector. This is in contrast to the actuating arms and other mechanisms in push/push type card eject mechanisms for coupling the cam slider of the eject mechanism to or into engagement with the memory card.

Figure 5:
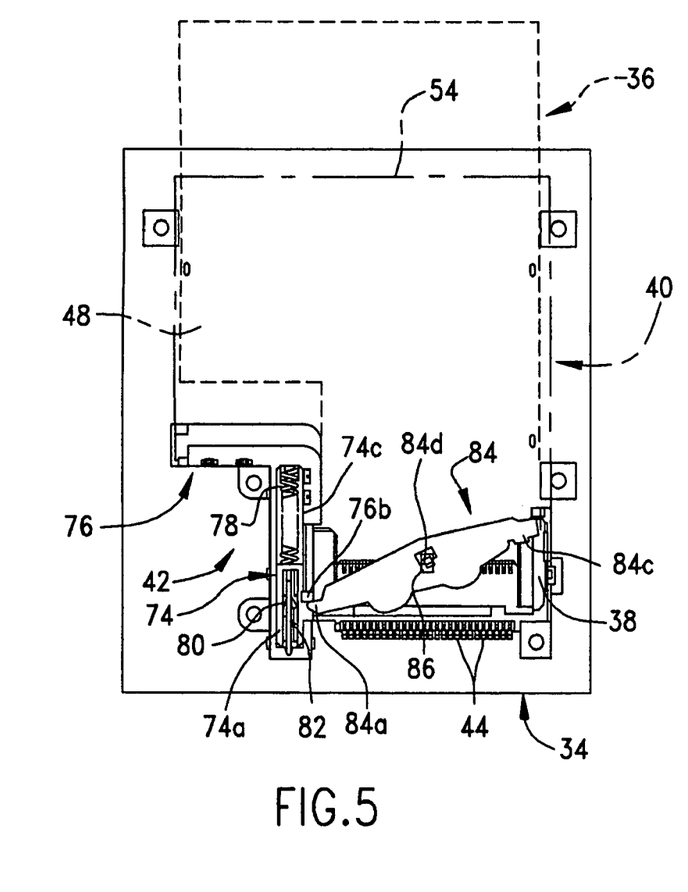
FIGS. 5-8 are sequential views showing the push/push action of the card eject mechanism.

FIGS. 5-8 show how card eject mechanism 42 operates sequentially in response to insertion of memory card 36 into card-receiving space 48 of connector 32. FIG. 5 basically shows the initial or "card-out" position of the memory card relative to the connector. In this position, cam slider 74 is biased forwardly by coil spring 78. The narrower leading end portion 36a (FIG. 2) of the memory card is in engagement with ejection tab 84c of actuating lever 84, with end 84b of the lever pivoted forwardly by coil spring 78. Pivot portion 82b of cam follower 82 is at the front end of cam slot 80.

Figure 6:
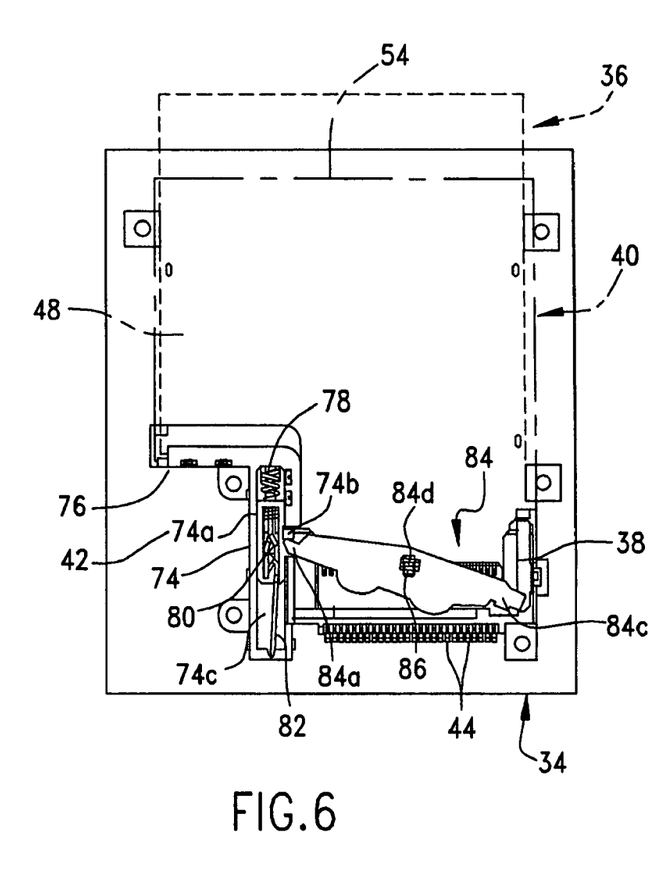

FIG. 6 shows memory card 36 pushed inwardly in the direction of arrow "A", pushing cam slider 74 therewith. With hook portion 82a of cam follower 82 fixing the cam follower to base 76, pivot end 82b of the cam follower rides forwardly within cam slot 80 to a sort of overrun position within the slot. Because of the engagement of the leading edge of the memory card with ejection tab 84c of actuating lever 84, the actuating lever pivots in response to the insertion movement of the memory card as can be seen in comparing FIGS. 5 and 6.

Figure 7:
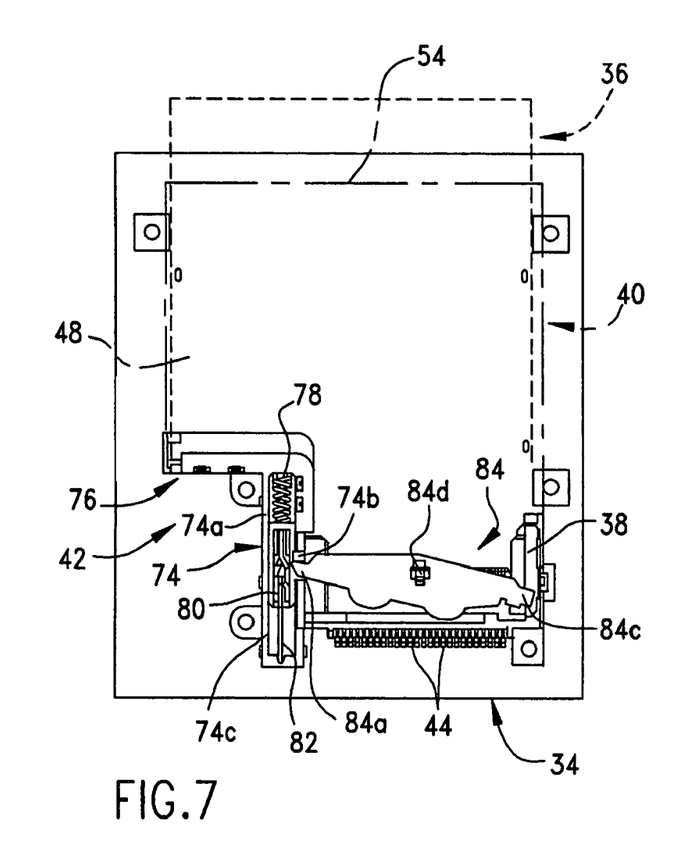
Figure 8:
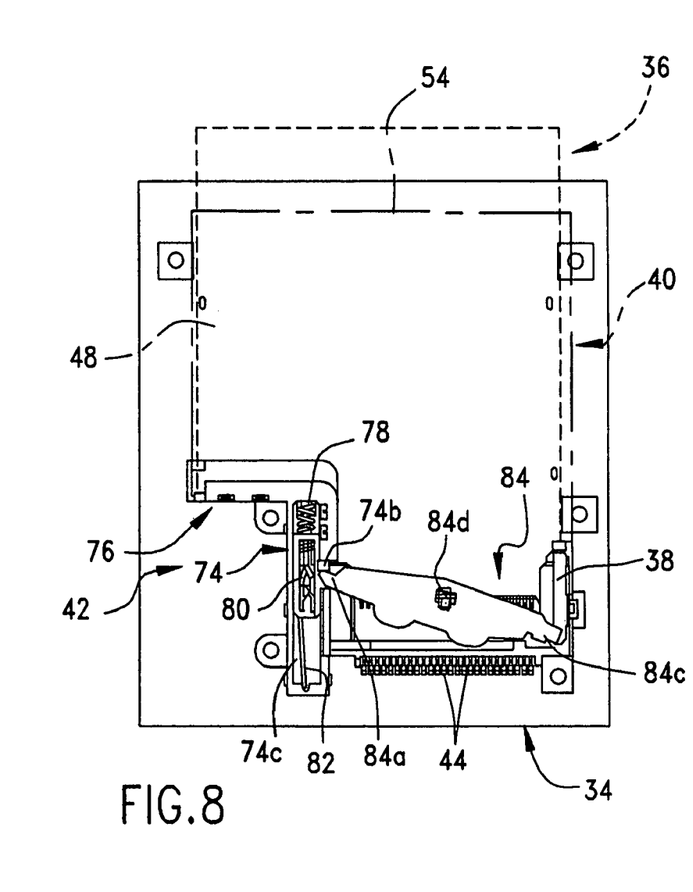

Upon removal of the pushing forces on memory card 36, coil spring 78 is effective to bias cam slider 74 and the memory card back outwardly, slightly to a locked position shown in FIG. 7 as defined by the interengagement of pivot end 82b of cam follower 82 within cam slot 80. The cam slider and memory card are stopped at this point as is known in the art of such push/push eject mechanisms which include heart-shaped cam slots. When it is desired to eject the memory card, the card is pushed back inwardly a second time, whereupon the locked condition of the card is released as pivot end 82b of cam follower 82 moves along the cam slot, and whereupon coil spring 78 is effective to eject the card back to its "card-out" position as shown in FIG. 8 and allow the card to be withdrawn from the card-receiving space 48 of the connector. In the locked position of the card as shown in FIG. 7, appropriate contacts on the card engage contact portions 44a of terminals 44. During all of this movement, actuating lever 84 pivots back and forth with the memory card under the action of cam slider 74 and the biasing influence of coil spring 78.

In order to mount housing 40 to printed circuit board 34 and to ground the metal shell to ground pads 62 on the board, a plurality of grounding portions 88 project outwardly from side walls 40b of the metal shell as seen in FIGS. 1 and 2. The grounding portions are aligned with and engage ground pads 62 on printed circuit board 34. The grounding portions have through holes which are aligned with the through holes 64 in the circuit board for receiving appropriate fasteners which fix the metal housing to the circuit board and ground the metal shell to the board through grounding portions 88 of the metal shell and grounds pads 62 of the circuit board.

FIGS. 9-12 show additional embodiments of the invention. Wherever possible, like reference numerals have been applied in the following descriptions of the additional drawings to designate like components described above in relation to the first embodiment of FIGS. 1-8.

Figure 9:
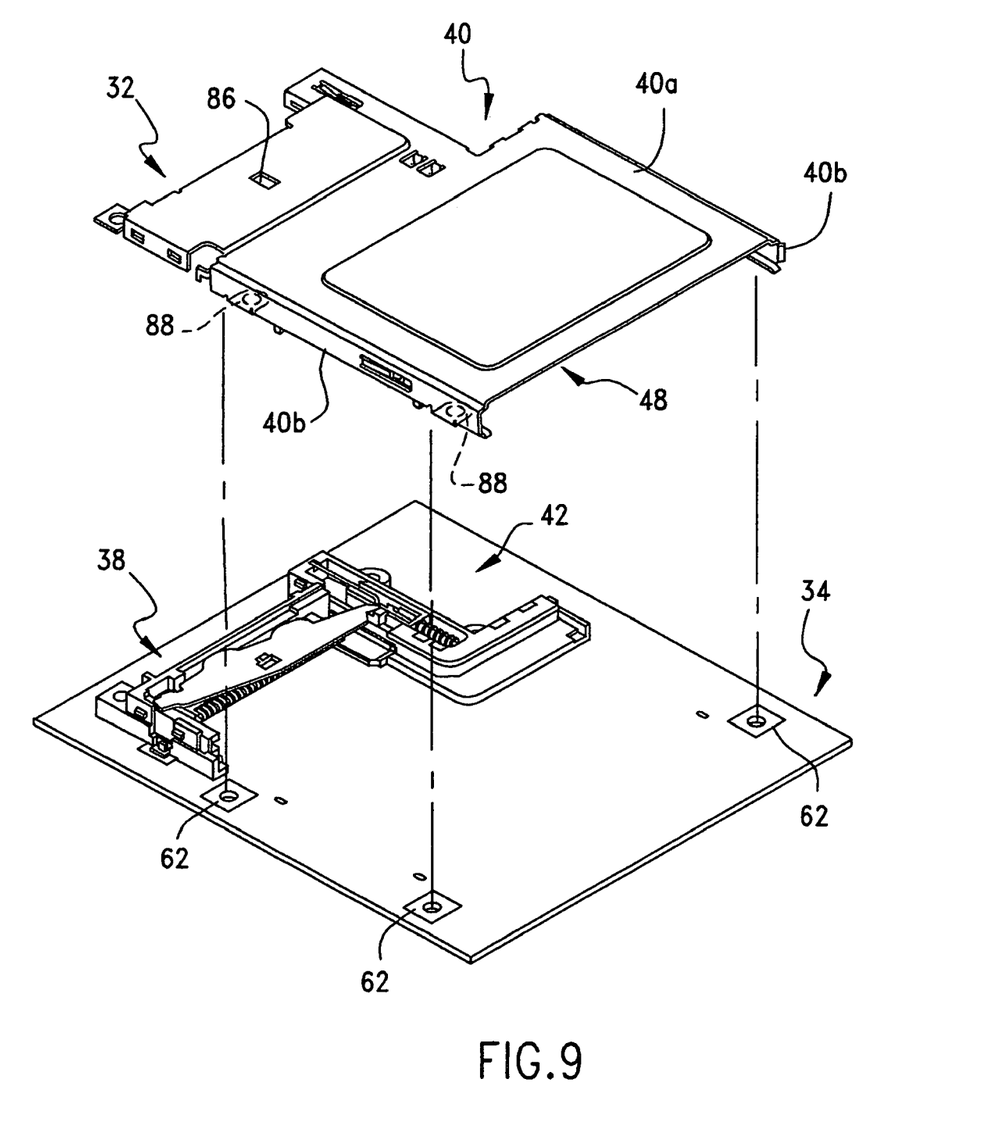
FIG. 9 is a perspective view somewhat similar to that of FIG. 1, but of a second embodiment of the invention.

With that understanding, FIG. 9 shows a second embodiment of the invention. In this embodiment, grounding portions 88 of metal shell 40 are bent inwardly rather than outwardly as shown in the first embodiment in FIGS. 1 and 2. The inwardly bent grounding portions of the second embodiment in FIG. 9, do not occupy valuable area or "real estate" on printed circuit board 34 laterally outwardly of the metal shell. Ground pads 62 on the circuit board are correspondingly configured to extend inwardly toward each other for alignment with the inwardly bent grounding portions 88 of the metal shell of the second embodiment.

Figure 10:
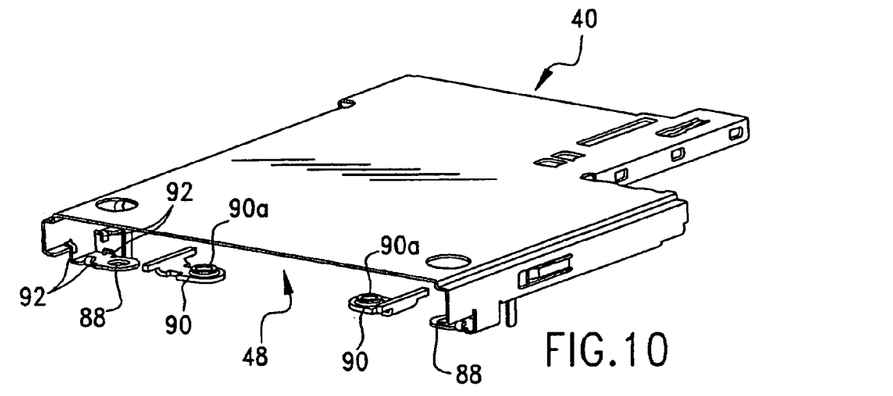
FIG. 10 is a perspective view of the metal shell according to a third embodiment of the invention.
Figure 11:
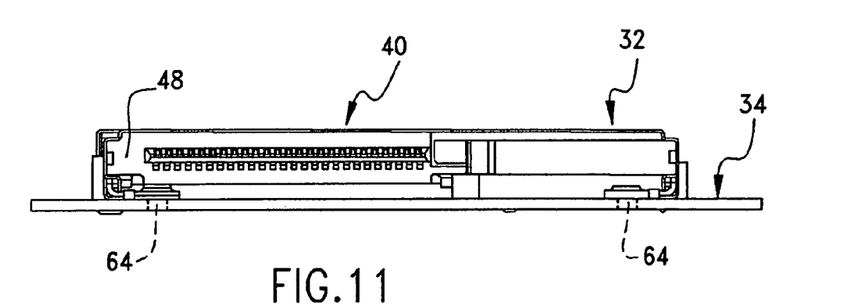
FIG. 11 is a front elevational view of the third embodiment.

FIGS. 10 and 11 show a third embodiment of the invention. In the third embodiment, separate grounding members 90 are positioned on top of inwardly bent grounding portions 88 of metal shell 40. The grounding members are located on top of grounding portions 88 by mounting clips 92. Grounding members 90 have internally threaded through holes 90a which are aligned with the through holes 64 in circuit board 34 for receiving externally threaded fasteners, such as bolts, projecting upwardly through the board and threaded into the internally threaded through holes 90a of grounding members 90.

Figure 12:
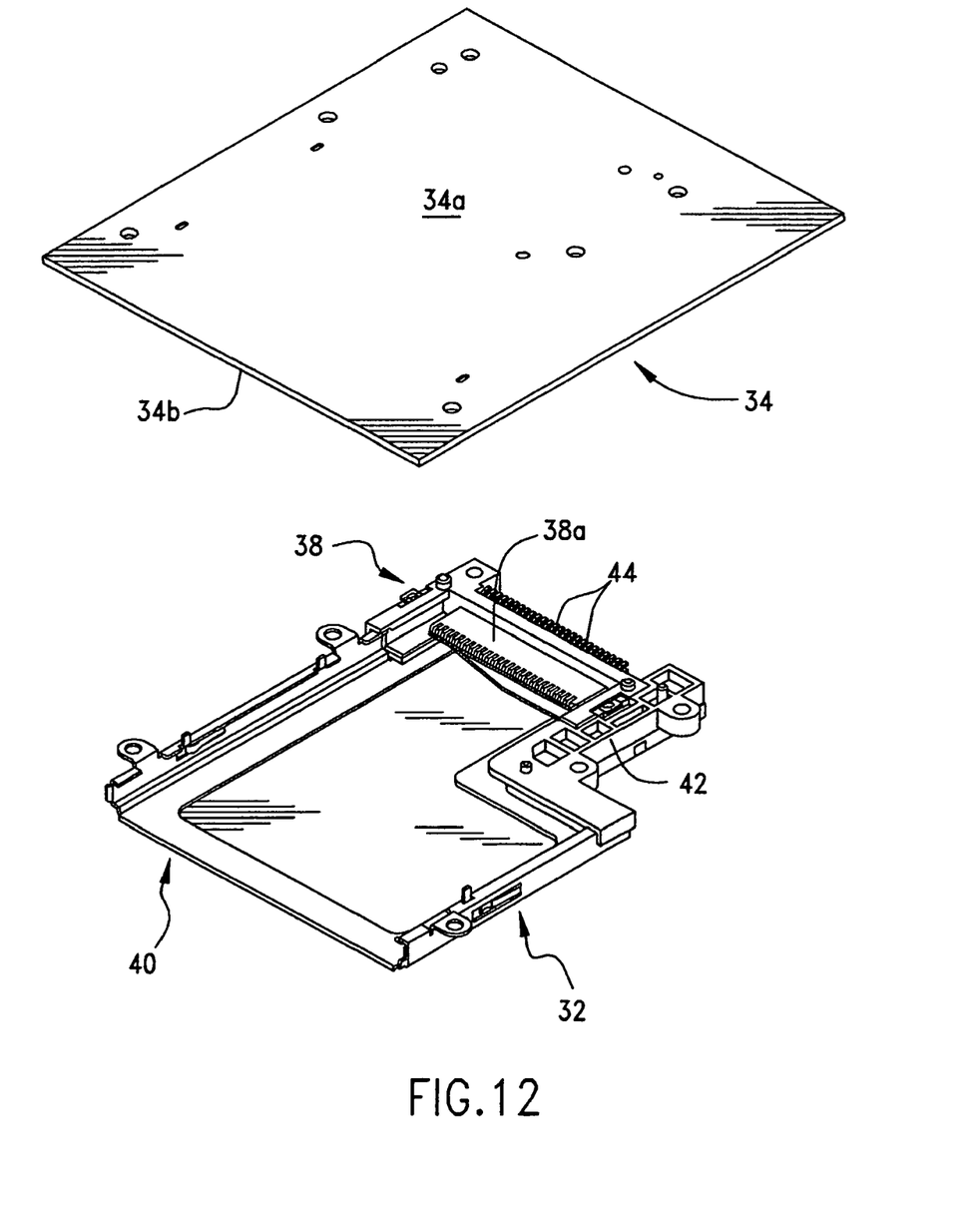
FIG. 12 is a perspective view of a fourth embodiment of the invention.

FIG. 12 shows a fourth embodiment of the invention. This embodiment simply shows memory card connector 32 mounted to a bottom surface 34b of printed circuit board 34. This would accommodate memory cards 36 or 36A being inserted below the printed circuit board.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A memory card connector, comprising:
   a metal shell having a front end and a rear end and defining a receiving space for receiving a memory card inserted into the receiving space in an insertion direction through an insert opening generally at the front end, wherein the front end of the metal shell is wider than the rear end thereof whereby the receiving space is generally L-shaped in a plane generally parallel to a top wall of the metal shell;
   an insulating socket generally at the rear end;
   a plurality of conductive terminals mounted in the insulating socket for electrical connection to the memory card; and
   a push/push card ejector including
      a body,
      a slider movably mounted on the body for reciprocating sliding movement in said insertion direction,
      a cam slot and cam follower means operatively associated with the slider for controlling movement of the slider in a push/push action,
      a spring, and
      an actuating lever extending transversely of the insertion direction having a first end engaging the slider and a second end engageable with the memory card for engaging and ejecting the memory card, the lever being pivotally mounted intermediate its first and second ends, wherein sufficient insertion of the memory card into the receiving space along the insertion direction causes the push/push card ejector to allow the memory card to rest in a coupled position and additional translation of the memory card in the insertion direction from the coupled position causes the push/push card ejector to eject the memory card at least partially out of the receiving space.

2. The memory card connector of claim 1, including a tab, the tab configured to pivotally couple the actuating lever to the metal shell.

3. The memory card connector of claim 2 wherein the metal shell includes a top wall defining a top of the receiving space, and the tab is formed on the actuation lever and positioned between the actuating lever and the top wall of the metal shell.

4. The memory card connector of claim 3 wherein the actuating lever is located above the insulating socket immediately beneath the top wall of the metal shell.

5. The memory card connector of claim 1 wherein the metal shell is stamped and formed of sheet metal material.

6. The memory card connector of claim 1 wherein the actuating lever is a plate-like member coupled to a top wall of the receiving space and configured to be above an inserted memory card, the lever including a downwardly projecting ejection tab at the second end of the lever that is configured to engage the inserted memory card.

7. The memory card connector of claim 1 wherein the body and the slider of the push/push card ejector are located behind the wider front end alongside the narrower rear end, the body and slider substantially configured so as to not substantially extend beyond the wider front end.

8. The memory card connector of claim 7 wherein the actuating lever of the push/push card ejector extends across the narrower rear end of the L-shaped receiving space.

9. A memory card connector, comprising:
a metal shell with a front end and a rear end, the metal shell defining a receiving space for receiving a memory card inserted into the receiving space in an insertion direction through an insert opening generally at the front end of the shell, the shell including a top wall defining a top of the receiving space, the front end of the metal shell being wider than the rear end thereof whereby the receiving space is generally L-shaped in a plane generally parallel to the top wall of the shell;
an insulating socket generally at the rear end of the metal shell opposite the insert opening;
a plurality of conductive terminals mounted in the insulating socket for electrical connection to the memory card; and
a push/push card ejector including
a body located behind the wider front end of the metal shell alongside the narrower rear end of the metal shell,
a slider movably mounted on the body for reciprocating sliding movement in the insertion direction,
a cam slot and cam follower means operatively associated with the slider for controlling movement of the slider in a push/push action, and
an actuating lever extending across the narrower rear end of the L-shaped receiving space generally transversely of the insertion direction and having a first end pivotally attached to the slider and a second end engageable with the memory card for engaging and ejecting the memory card, the lever being pivotally mounted intermediate its first and second ends wherein translation of the memory card in the insertion direction from a coupled position causes the push/push card ejector to eject the memory card at least partially out of the receiving space.

10. The memory card connector of claim 9, including a tab, the tab configured to pivotally couple the actuating lever to the top wall.

11. The memory card connector of claim 10 wherein the tab is formed on the actuating lever and positioned between the actuating lever and top wall of the metal shell.

12. The memory card connector of claim 9, wherein the insulating socket is positioned a first distance from the top wall and the actuating lever includes an intermediate portion, the intermediate portion including a plate-like portion extending between the first end and the second end and a pivoting connection mounted to the top wall, the intermediate portion extending a second distance from the top wall, the second distance being less than the first distance.

13. The memory card connector of claim 12 wherein the actuating lever is located at least partially directly above the insulating socket, the intermediate portion positioned so as to be between the top of the receiving space and an inserted memory card, the lever including a downwardly projecting ejection tab at the second end of the lever that is configured to engage the inserted memory card.

14. A memory card connector, comprising:
a metal shell with a front end, a rear end, a top wall, a first side wall extending substantially between the front end and the rear end and a second side wall extending substantially between the front end and the rear end, the second side wall having a first portion and a second portion, wherein a first distance between the first wall and the first portion is greater then a second distance between the first wall and the second portion, the front end forming an opening configured to receive a memory card, wherein the first wall and the second wall form a guide for inserting a memory card;
an insulating socket positioned generally near the rear end;
a plurality of conductive terminals mounted in the insulating socket;
a push/push card ejector positioned along the second portion, the push/push card ejector including a cam slider, a cam follower, a spring and a pivotally attached actuating lever, the push/push card ejector configured to allow the memory card to rest in a coupled position when the card is inserted along a first direction into the opening and further configured to eject the memory card when the memory card is pushed in the first direction from the coupled position, wherein substantially all of the push/push card ejector is positioned a distance away from the first wall that is less than the first distance.

15. The connector of claim 14, wherein the metal shell includes a plurality of terminals that are configured to be positioned on a printed circuit board.

16. The connector of claim 14, wherein the actuating lever is pivotally attached to the top wall and the actuating lever includes a first end, a second end and a plate-like member extending between the first and second end, the plate-like member configured to be positioned between the memory card and the top wall when the memory card is in the coupled position.

17. The connector of claim 14, wherein the metal shell includes a plurality of terminals that are bent inward so as to minimize space required to seat the connector.

18. The connector of claim 14, wherein the metal shell includes a plurality of terminals configured to engage a plurality of pads on a printed circuit board, each of the plurality of terminals including a threaded aperture and having a configuration selected from a group of inwardly bent terminals and outwardly bent terminals.

19. The connector of claim 14, wherein the distance between the first side wall and the first portion of the second side wall is sized to allow the memory card to be inserted therebetween such that the first side wall and first portion substantially prevent lateral movement of the memory card when inserted therein.

* * * * *